United States Patent
Lee et al.

(10) Patent No.: US 9,123,181 B2
(45) Date of Patent: Sep. 1, 2015

(54) METHOD AND SOFTWARE FOR CREATING AN IMAGE FILE INCLUDING MULTIPLE STILL IMAGES AND SPECIAL EFFECTS

(75) Inventors: Kyung Ran Lee, Seoul (KR); Soon Ho Kwon, Seoul (KR); Joon-kee Chang, Yongin-si (KR); HoJin Jang, Seoul (KR); Dong Ho Park, Seoul (KR); Soon Sik So, Seoul (KR)

(73) Assignee: NHN CORPORATION, Kyunggi-Do (KR)

( * ) Notice: Subject to any disclaimer, the term of this patent is extended or adjusted under 35 U.S.C. 154(b) by 1270 days.

(21) Appl. No.: 12/062,395

(22) Filed: Apr. 3, 2008

(65) Prior Publication Data

US 2008/0250321 A1 Oct. 9, 2008

(30) Foreign Application Priority Data

Apr. 4, 2007 (KR) ........................ 10-2007-0033466

(51) Int. Cl.
*G06F 3/0481* (2013.01)
*G06F 3/0482* (2013.01)
(Continued)

(52) U.S. Cl.
CPC .............. *G06T 13/80* (2013.01); *G11B 27/034* (2013.01); *G11B 27/34* (2013.01)

(58) Field of Classification Search
CPC ..... G06F 8/34; G06F 3/0481; G06F 3/04847; G06F 3/0482; G06F 9/4443; G06F 3/04817; G05B 19/0426; G05B 2219/23258; H04N 5/44543
USPC ......................................... 715/771, 810, 764
See application file for complete search history.

(56) References Cited

U.S. PATENT DOCUMENTS 6,091,411 A * 7/2000 Straub et al. .................. 715/747
6,123,362 A * 9/2000 Squilla et al. .................. 283/67
(Continued)

FOREIGN PATENT DOCUMENTS

JP 11-146333 5/1999
KR 1020000072269 12/2000
(Continued)

OTHER PUBLICATIONS

Office Action issued by the Korean Intellectual Patent Office on Nov. 12, 2008 in related Korean patent application # 10-2007-0033466.

*Primary Examiner* — Amy Ng
*Assistant Examiner* — Erik Stitt
(74) *Attorney, Agent, or Firm* — Harness, Dickey & Pierce, P.L.C.

(57) ABSTRACT

Disclosed is a method of creating a pleasure image file comprising a plurality of images. The method comprises providing a plurality of still image files for use in creating a pleasure image file comprising a plurality of still images from the plurality of still image files and receiving an input indicative of a sequence for displaying the plurality of still images when playing the pleasure image file. Incorporating some effects for each still image in creating the image file comprises assigning a period during which each still image is to be displayed on a screen, adding a display special effect to be used while displaying the at least one still image, and creating the pleasure image file configured to display the plurality of still images on a screen in accordance with the sequence each for the assigned period, wherein the at least one still image is to be displayed with the display special effect.

21 Claims, 10 Drawing Sheets

(51) Int. Cl.
  *G06T 13/80* (2011.01)
  *G11B 27/034* (2006.01)
  *G11B 27/34* (2006.01)

(56) References Cited

U.S. PATENT DOCUMENTS

| | | | | |
|---|---|---|---|---|
| 6,967,666 | B1* | 11/2005 | Koda | 345/638 |
| 6,976,229 | B1* | 12/2005 | Balabanovic et al. | 715/838 |
| 7,474,801 | B2* | 1/2009 | Teo et al. | 382/284 |
| 7,644,364 | B2* | 1/2010 | Patten et al. | 715/726 |
| 7,743,342 | B2* | 6/2010 | Nishijima | 715/836 |
| 7,843,581 | B2* | 11/2010 | Hill et al. | 358/1.15 |
| 7,945,852 | B1* | 5/2011 | Pilskalns | 715/230 |
| 2003/0227493 | A1* | 12/2003 | Yokomizo | 345/867 |
| 2003/0231202 | A1* | 12/2003 | Parker et al. | 345/730 |
| 2004/0085578 | A1* | 5/2004 | Quek et al. | 358/1.18 |
| 2005/0044485 | A1* | 2/2005 | Mondry et al. | 715/502 |
| 2005/0120655 | A1* | 6/2005 | Wolff et al. | 52/311.1 |
| 2005/0155086 | A1* | 7/2005 | Schick et al. | 725/153 |
| 2006/0181736 | A1* | 8/2006 | Quek et al. | 358/1.18 |
| 2006/0277454 | A1* | 12/2006 | Chen | 715/500.1 |
| 2008/0034325 | A1* | 2/2008 | Ording | 715/838 |
| 2008/0104516 | A1* | 5/2008 | Lee | 715/732 |
| 2008/0126939 | A1* | 5/2008 | Chung et al. | 715/723 |
| 2008/0148153 | A1* | 6/2008 | Lee et al. | 715/730 |
| 2008/0168048 | A1* | 7/2008 | Bell et al. | 707/5 |
| 2008/0215964 | A1* | 9/2008 | Abrams et al. | 715/246 |
| 2008/0215985 | A1* | 9/2008 | Batchelder et al. | 715/731 |
| 2009/0327927 | A1* | 12/2009 | De Leon et al. | 715/763 |
| 2010/0223568 | A1* | 9/2010 | Quek et al. | 715/765 |

FOREIGN PATENT DOCUMENTS

| | | |
|---|---|---|
| KR | 1020020061212 | 7/2002 |
| KR | 1020050003690 | 1/2005 |
| KR | 1020060023041 | 3/2006 |

* cited by examiner

METHOD AND SOFTWARE FOR CREATING AN IMAGE FILE INCLUDING MULTIPLE STILL IMAGES AND SPECIAL EFFECTS

CROSS-REFERENCE TO RELATED APPLICATION

This application claims priority from Korean Patent Application No. 10-2007-0033466, filed on Apr. 4, 2007, in the Korean Intellectual Property Office, the entire disclosure of which is incorporated herein by reference.

BACKGROUND

1. Field

The present disclosure relates to technologies for creating a file using a Personal Computer (PC) and the like, and more particularly, to a method and apparatus for generating an edited image file.

2. Discussion of the Related Technology

Along with development in PCs, memories, and the like, an amount of data semi-permanently possessed by a user is increasing geometrically. Recent PCs constructing a variety of interfaces may facilitate to transmit/receive data to/from peripheral equipments, and also have a function for editing video data having been stored therein.

For example, PCs may read video data embedded in a hard disk drive (HDD) or video data stored in a Universal Serial Bus (USB) peripheral device, edit the read video data into a new file useful to the user, and store the edited new file.

The foregoing discussion in the background section is to provide general background information, and does not constitute an admission of the prior art.

SUMMARY

One of the aspects of the inventions provides a method of creating a pleasure image file comprising a plurality of images. The method comprises: providing a plurality of still image files for use in creating a pleasure image file comprises a plurality of still images from the plurality of still image files; receiving an input indicative of a sequence for displaying the plurality of still images when playing the pleasure image file; assigning, to each of the plurality of still images, a period during which each still image is to be displayed on a screen; adding, to at least one of the plurality of still images, a display special effect to be used while displaying the at least one still image; and creating the pleasure image file configured to display the plurality of still images on a screen in accordance with the sequence each for the assigned period, wherein the at least one still image is to be displayed with the display special effect.

The foregoing method may further comprise determining if each of the plurality of images is a still image. Receiving the input may comprise monitoring a sequence of providing the plurality of still image files and may further comprise receiving a desired sequence from a user. The pleasure image being created may comprise moving at least part of the still image being displayed to move from one position to another on the screen and the same period may be assigned to each of the plurality of still images, wherein a length of the period is predetermined. In one of the other options, assigning the period may comprise receiving an input of a desired period and at least one of the plurality of still images may be assigned a different length of the period.

Adding the display special effect may further comprise selecting at least one from the group consisting of: moving a whole still image from one position to another on the screen, enlarging at least part of a still image, reducing the size of at least part of a still image, and a combination of at least one of the forgoing. One of the display special effects may be randomly selected for each of the plurality of images. Further adding may comprise adding to at least one of the plurality of still images, a transition special effect to be used while transitioning between two of the plurality of still images, wherein the transition special effect may comprise at least one from the group consisting of a fade effect, a dissolve effect, a blind effect, a mosaic effect, a page turning-over effect.

The foregoing method may further comprise: providing at least one video file, each comprising a video image; and incorporating the at least one video image into the pleasure image file. The method may comprise encoding the pleasure image file into a desired format that is required by a website, wherein the method may further comprise uploading the encoded format to the website.

Another aspect of the invention provides a computer executable program for creating a pleasure image file comprising a plurality of images. The computer program comprises: a selection module configured to recognize a plurality of user selected still image files for use in creating a pleasure image file comprises a plurality of still images from the plurality of still image files; a sequence module configured to receive an input indicative of a sequence for displaying the plurality of still images when playing the pleasure image file; a display period module configured to assign, to each of the plurality of still images, a period during which each still image is to be displayed on a screen; a special effect module configured to add, to at least one of the plurality of still images, a display special effect to be used while displaying the at least one still image; and a incorporation module configured to create the pleasure image file configured to display the plurality of still images on a screen in accordance with the sequence each for the assigned period, wherein the at least one still image is to be displayed with the display special effect.

The program may further comprise a still image determining module configured to determine if each of the plurality of images is a still image and an encoding module configured to encode the pleasure image file into a format.

Yet another aspect of the invention provides a computer executable program for creating a pleasure image file comprising a plurality of images, wherein when executed the program is configured to have a computer to perform a method may comprise: recognizing a plurality of user selected still image files for use in creating a pleasure image file comprises a plurality of still images from the plurality of still image files; receiving an input indicative of a sequence for displaying the plurality of still images when playing the pleasure image file; assigning, to each of the plurality of still images, a period during which each still image is to be displayed on a screen; adding, to at least one of the plurality of still images, a display special effect to be used while displaying the at least one still image; and creating the pleasure image file configured to display the plurality of still images on a screen in accordance with the sequence each for the assigned period, wherein the at least one still image is to be displayed with the display special effect.

BRIEF DESCRIPTION OF THE DRAWINGS

The above and other aspects of the present invention will become apparent and more readily appreciated from the following detailed description of certain embodiments of the invention, taken in conjunction with the accompanying drawings of which.

DETAILED DESCRIPTION OF EMBODIMENTS

Figure 1:
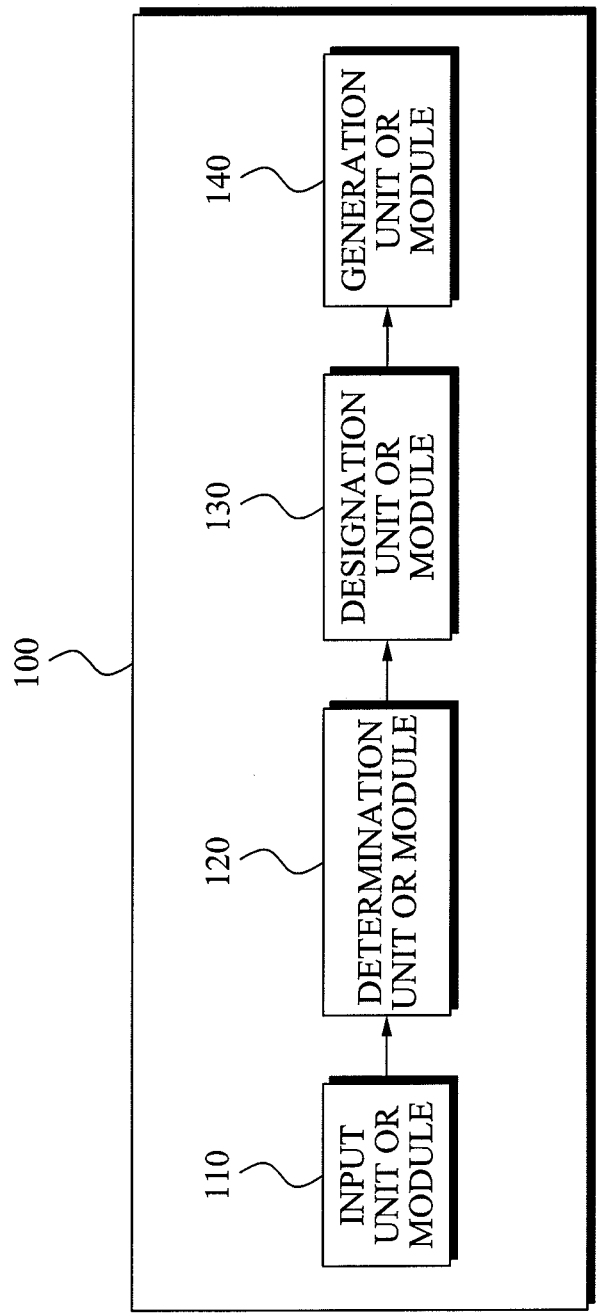
FIG. 1 is a block diagram illustrating a configuration of an apparatus for automatically generating an edited file according to an embodiment of the invention.

Reference will now be made in detail to embodiments of the present invention, examples of which are illustrated in the accompanying drawings, wherein like reference numerals refer to the like elements throughout.

When detailed descriptions related to a well-known related function or configuration are determined to make the spirits of the present invention ambiguous, the detailed descriptions will be omitted herein. Also, terms used throughout the present specification are used to appropriately describe embodiments of the present invention, and thus may be different depending upon a user and an operator's intention, or practices of application fields of the present invention. Therefore, the terms need to be defined based on descriptions made through the present disclosure.

Typical Editing schemes for editing a file in PCs may have the following problems. First, only a fixed edition style may be provided such as trimming and connecting a moving image file having been stored, and thus not allowing users requiring a variety of editing functions to be satisfied. Second, the typical editing schemes may restrict editing to only moving image files. Third, a user may be required to execute a great number of operations in order to create a new edited file.

FIG. 1 is a block diagram illustrating a configuration of an apparatus 100 for automatically generating an edited file according to an embodiment of the invention.

As illustrated in FIG. 1, the apparatus 100 according to an embodiment of the invention includes an input unit (module) 110, a determination unit 120, a designation unit 130, a generation unit 140, and the like. The apparatus 100 may designate a system which includes a memory means such as a Personal Computer (PC), a notebook PC, a Personal Digital Assistant (PDA), a mobile terminal, and the like and uses a microprocessor embedded therein to thereby have operation capabilities. Also, the apparatus 100 may communicate with a web site. Only configuration components directly or indirectly related with embodiments of the present invention will be herein described in detail, and the description of other configuration components will be omitted. Despite this omission, however, an embodiment of the present invention will be well understood to those skilled in the art.

The input unit 110 may sequentially receive an authorization of a signal that selects at least one file intended to be edited. In this instance, the at least one file may be a moving image (video) file, a still image file, and the like. Also, the at least one file may be a file having been stored in a memory of the apparatus 100, or a file authorized from a peripheral equipment.

The determination unit or module 120 may determine whether the file selected through the input unit 110 is a moving image file or a still image file. The designation unit 130 may designate a period during which the still image file is displayed according to a predetermined criterion when the file selected through the input unit 110 is the still image file based on the determination result of the determination unit 120. However, the period may be designated according to the predetermined criterions such as size, compression type, corrected date, and the like of the still image file. Alternatively, the period may be designated as an identical period with respect to all still image files or as an arbitrary period with respective to all still image files, respectively.

The generation unit 140 may determine a style in which the still image file is displayed while being actively moved, and generate all files authorized through the input unit 110 to be a single image edited file. Specifically, embodiments of the present invention may be designed such that even the still image is displayed while being dynamically moved. Thus, edition screens of various styles may be advantageously provided even in a case where only still image files are edited, or the moving image file and the still image file are simultaneously edited. The specific implementing schemes will be described in detail with reference to FIGS. 2 to 8.

Figure 2:
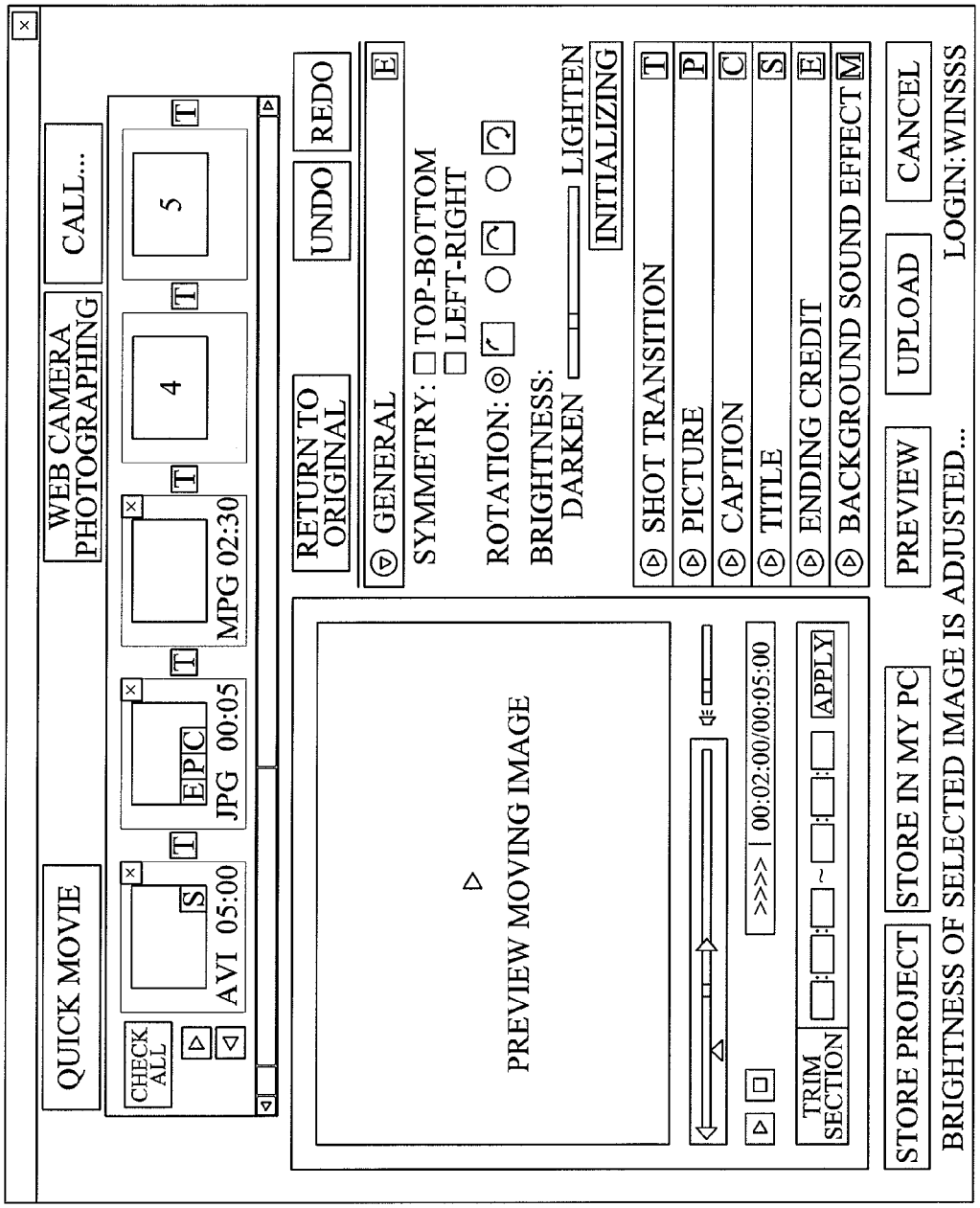
FIG. 2 is a diagram illustrating an example of a main screen provided by a method for automatically generating an edited file according to an embodiment of the invention.

FIG. 2 is a diagram illustrating an example of a main screen provided by a method for automatically generating an edited file according to an embodiment of the invention.

A function for implementing the method of an embodiment may be referred to as a 'quick movie' function, however, embodiments of the invention are not limited thereto.

A quick movie function of an embodiment may be designed such that a quick movie button is clicked on, as illustrated in FIG. 2. When the quick movie button is clicked on, a function for generating the still images into a pleasure image may be initially executed. Obviously, the quick movie button may be designed to be positioned in the different location, or to be automatically executed, as necessary.

Figure 3:
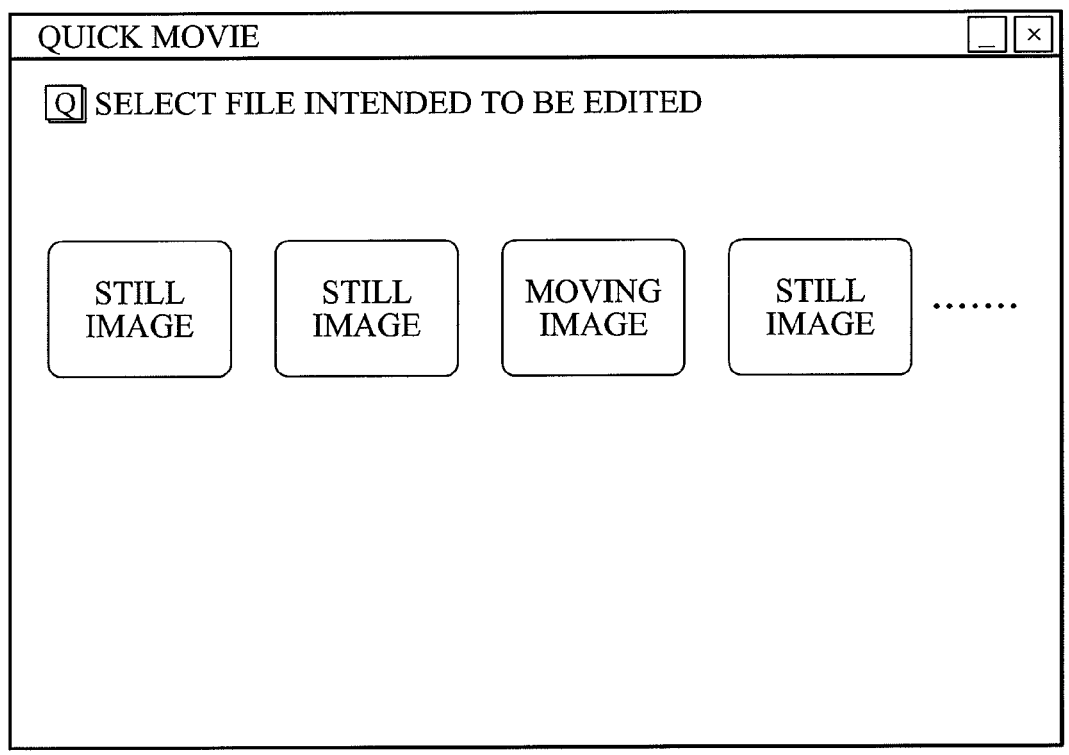
FIG. 3 is a diagram illustrating a process where a file intended to be edited is selected by the method of FIG. 2.

FIG. 3 is a diagram illustrating a process where a file intended to be edited is selected by the method of FIG. 2.

A screen illustrated in FIG. 3 may be displayed after the quick movie button of FIG. 2 is clicked on. A user may be allowed to select the still image file as well as the moving image file intended to be edited. According to an embodiment, the still image file and the moving image file may be simultaneously selected to be edited to create a pleasure image file.

As illustrated in FIG. 3, when the still image file and the moving image file intended to be edited are selected, the determination unit 120 may determine whether the still image file is present in the files intended to be edited. When the still image file is present in the files intended to be edited, the designation unit 130 may designate a period during which the still image file is displayed while being moved on the screen in a specific direction. In this instance, the designation unit 130 may assign a period for each still image file according to a predetermined criterion. As an example, a configuration of the screen capable of being readily viewed by the user may be acquired by designating an identical period, or a dynamic configuration of the screen may be acquired by designating a random period. As another example, a period may be diversely assigned according to the size, compression type, corrected date, and the like of the still image file. Also, the moving image file may be designed such that the replaying time is arbitrarily changed, as necessary.

Figure 4A:
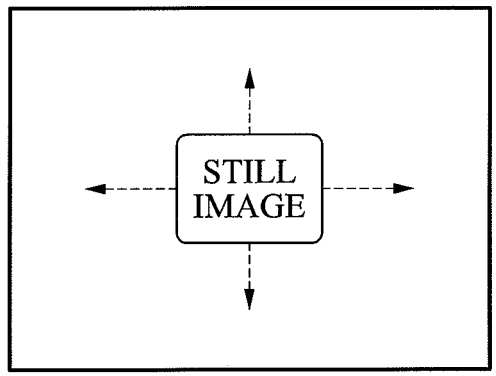
FIG. 4A is a diagram illustrating a first example in which a newly generated pleasure image edited file is displayed by the method of FIG. 2.
Figure 4B:
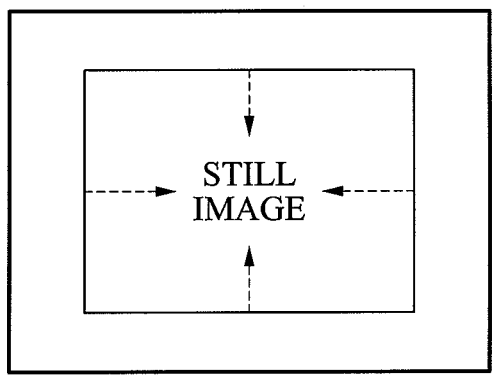
FIG. 4B is a diagram illustrating a second example in which a newly generated pleasure image edited file is displayed by the method of FIG. 2.
Figure 4C:
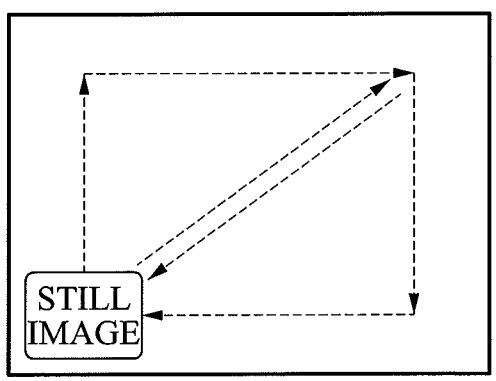
FIG. 4C is a diagram illustrating a third example in which a newly generated pleasure image edited file is displayed by the method of FIG. 2.

FIG. 4A is a diagram illustrating a first example in which a newly generated pleasure image file is displayed by the method described with reference to FIG. 2, FIG. 4B is a diagram illustrating a second example in which a newly generated pleasure image edited file is displayed by the method described with reference to FIG. 2, and FIG. 4C is a diagram illustrating a third example in which a newly generated pleasure image edited file is displayed by the method described with reference to FIG. 2.

As described above, there is a problem in that the still image file is decoded as is and displayed in the case where the still image file intended to be edited is selected, thereby failing to meet various needs of users. In this regard, according to an embodiment, the still image file is displayed in various schemes even without a separate operation performed by the user, thereby generating a new pleasure image file.

As illustrated in FIG. 4A, the still image file may be designed to be displayed such that an initial still image may be enlarged and moved in a dotted arrow direction over time after being displayed in a center region or arbitrary region of the screen. As illustrated in FIG. 4B, the still image file may be designed to be displayed such that the initial still image may be reduced and moved in a dotted arrow direction over time after being displayed in the center region or arbitrary region of the screen. As illustrated in FIG. 4C, the still image file may be designed to be displayed such that the initial still image may be moved in a dotted arrow direction over time after being displayed in the center region or arbitrary region of the screen. Obviously, the above described display schemes are merely examples, and thus a variation such that at least one still image file is displayed while being automatically moved from a first region to a second region within the screen will not depart from the scope and the spirit of the present invention. Accordingly, the generation unit (module) 140 may collect all of the still image files displayed as illustrated in FIGS. 4A to 4C, and encode the collected still image files to be a single pleasure image file. Obviously, as described above, the still image files and the moving image files may be encoded to be a single pleasure image file. For the convenience of the user, the display scheme may be arbitrarily determined by the apparatus 100, however, may be determined by the user, as necessary.

Although not shown, in processes ranging from editing a still image file to editing another still image file, a fade effect, a dissolve effect, a blind effect, a mosaic effect, and a page turning-over effect, and the like may be inserted therein.

The fade effect may designate a shot transition effect such that a screen is gradually darkened or gradually lightened. The dissolve effect may designate an overlap effect created by gradually transiting from the end of one clip to the beginning of another. The blind effect may designate a venetian-blind effect created by shifting one still image file to the following still image file. The mosaic effect may be created such that one still image file and the following image file are overlapped and gradually shifted towards each other in a state where they are divided into a mosaic. The page turning-over effect may be created such that one still image file is shifted to the following still image file such as turning-over pages.

Figure 5:
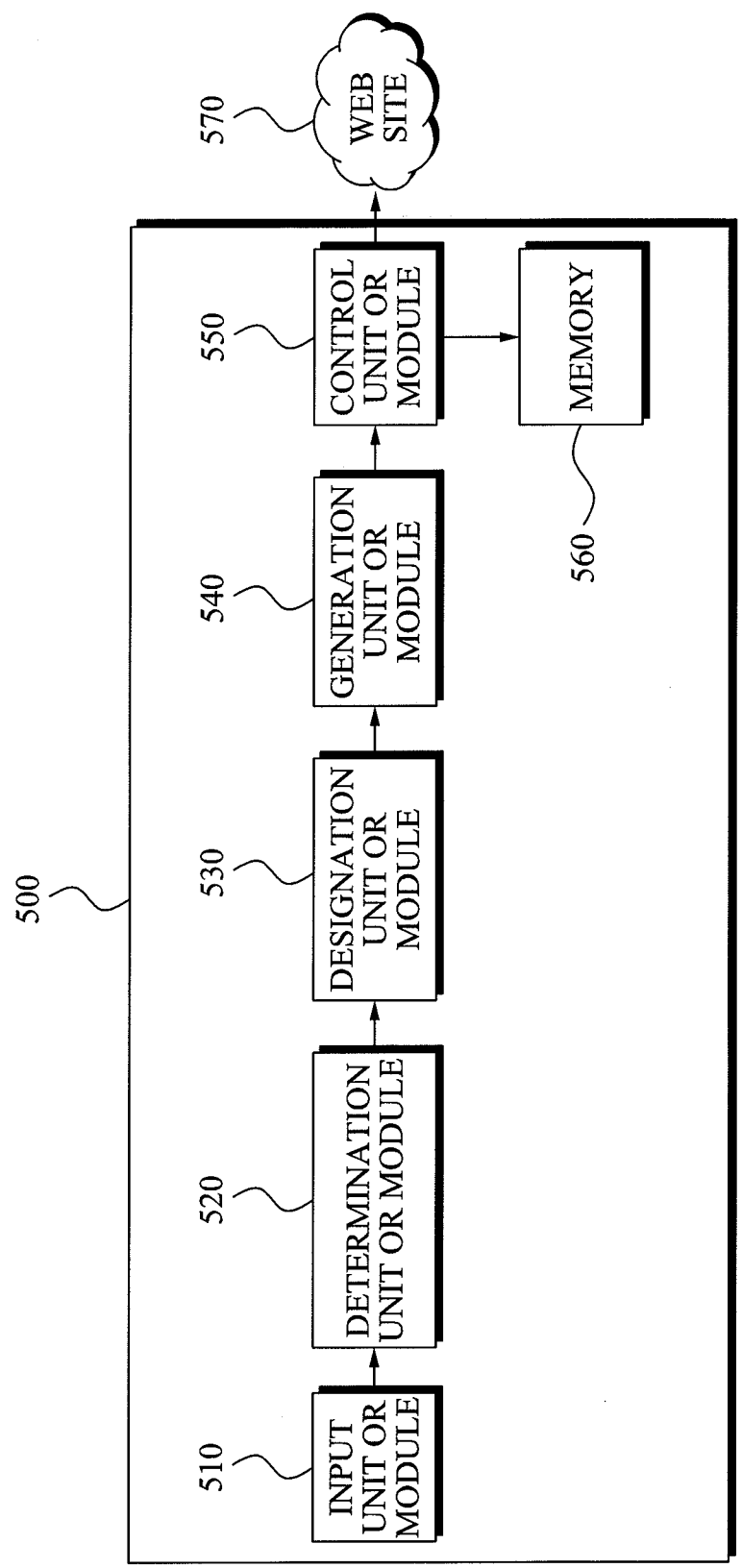
FIG. 5 is a block diagram illustrating a configuration of an apparatus for automatically generating an edited file according to another embodiment of the invention.

FIG. 5 is a block diagram illustrating of a configuration of an apparatus 500 for automatically generating an edited file according to another embodiment of the invention.

The apparatus 500 according to an embodiment includes an input unit 510, a determination unit 520, a designation unit 530, a generation unit 540, a control unit 550, and a memory 560. Although not shown, the apparatus 500 includes a communication system that allows the apparatus 500 to be connected with the Internet. Accordingly, the apparatus 500 may transmit/receive predetermined data to/from an arbitrary website 570.

In the case where a quick movie function of an embodiment is executed to thereby generate a new pleasure image file, the pleasure image file may be generally stored in the memory 560 of the apparatus 500. However, according to an embodiment, the control unit 550 may encode the pleasure image file into a format capable of being uploaded to a specific website 570 of an Internet server. Specifically, the control unit 550 may serve as an encoder. For the convenience of the user, the specific website 570 may be set in advance, or separately inputted by the user when the encoding of the pleasure image file is completed.

More specifically, the control unit 550 may determine whether to be connected to the specific website 570 after connecting with the predetermined specific website to thereby determine whether a log-in request is registered. The control unit 550 may upload the encoded pleasure image file to the specific website when determined to be connected with the predetermined specific website 570 according to the determination result. Conversely, the control unit 550 may store the encoded pleasure image file in the memory 560 when determined to be unconnected with the predetermined specific website according to the determination result. The memory 560 may be a hard disk drive (HDD), a flash memory, and the like where an arbitrary data is stored.

Thus, according to an embodiment, a new pleasure image file may be automatically generated only by selecting the still image file intended to be edited by the user, and further the generated pleasure image file may be rapidly uploaded to a specific website useful to the user.

Figure 6:
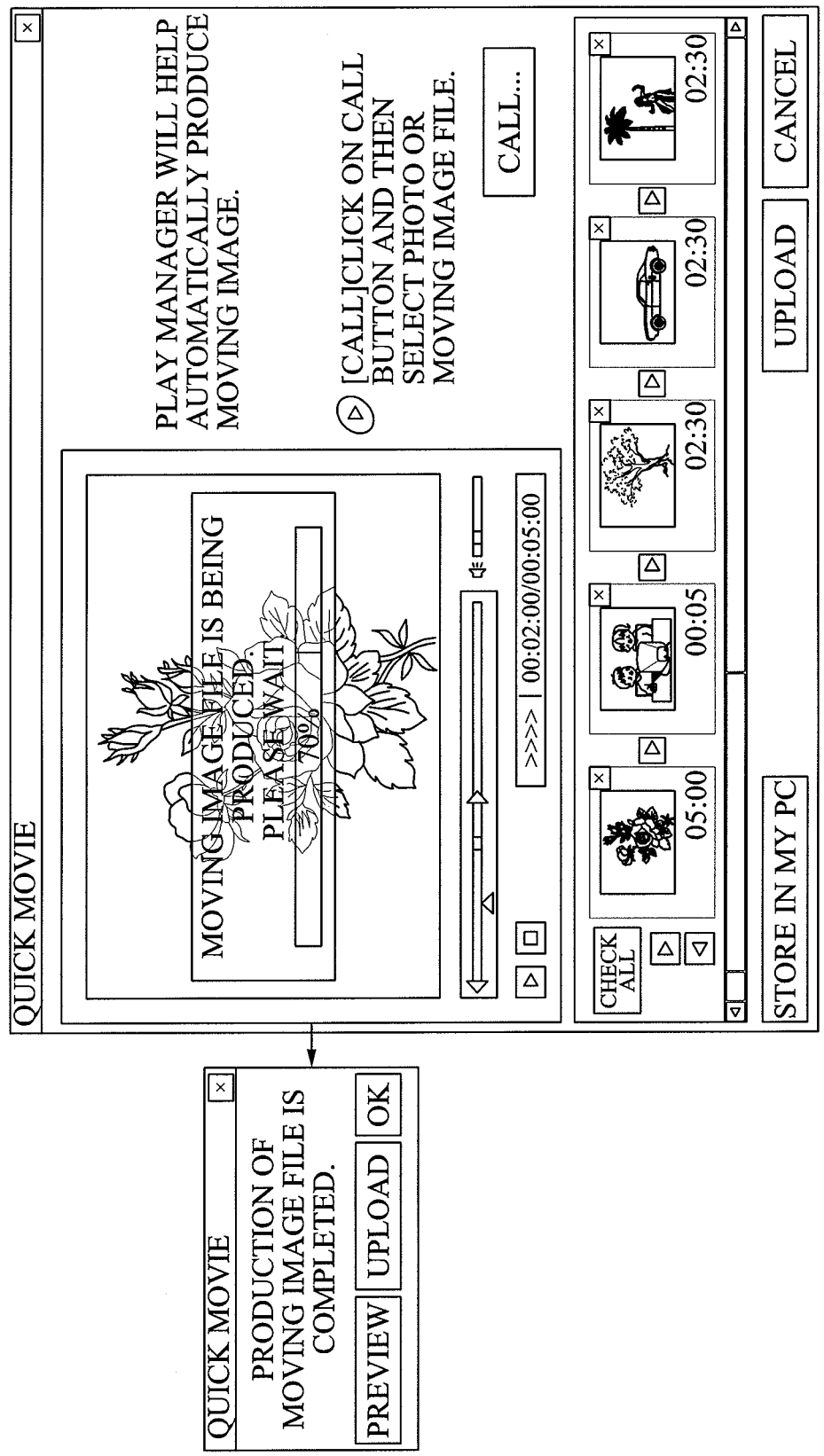
FIG. 6 is a diagram illustrating a process where a newly generated pleasure image edited file is encoded by a method for automatically updating an edited file according to an embodiment of the invention.

FIG. 6 is a diagram illustrating a process where a newly generated pleasure image file is encoded by a method for automatically generating an edited file according to an embodiment of the invention.

A pleasure image file capable of being uploaded to an arbitrary Internet server may be generated even without a separate operation performed by the user, as illustrated in a right side of FIG. 6, and a guidance message showing a current status of the pleasure image file may be displayed. Next, a guidance message confirming whether the generated pleasure image file is uploaded to the Internet server may be displayed as illustrated in a left side of FIG. 6, when the generation of the pleasure image file is completed. Obviously, the pleasure image file may be automatically uploaded to the Internet server without the guidance messages.

Figure 7A:
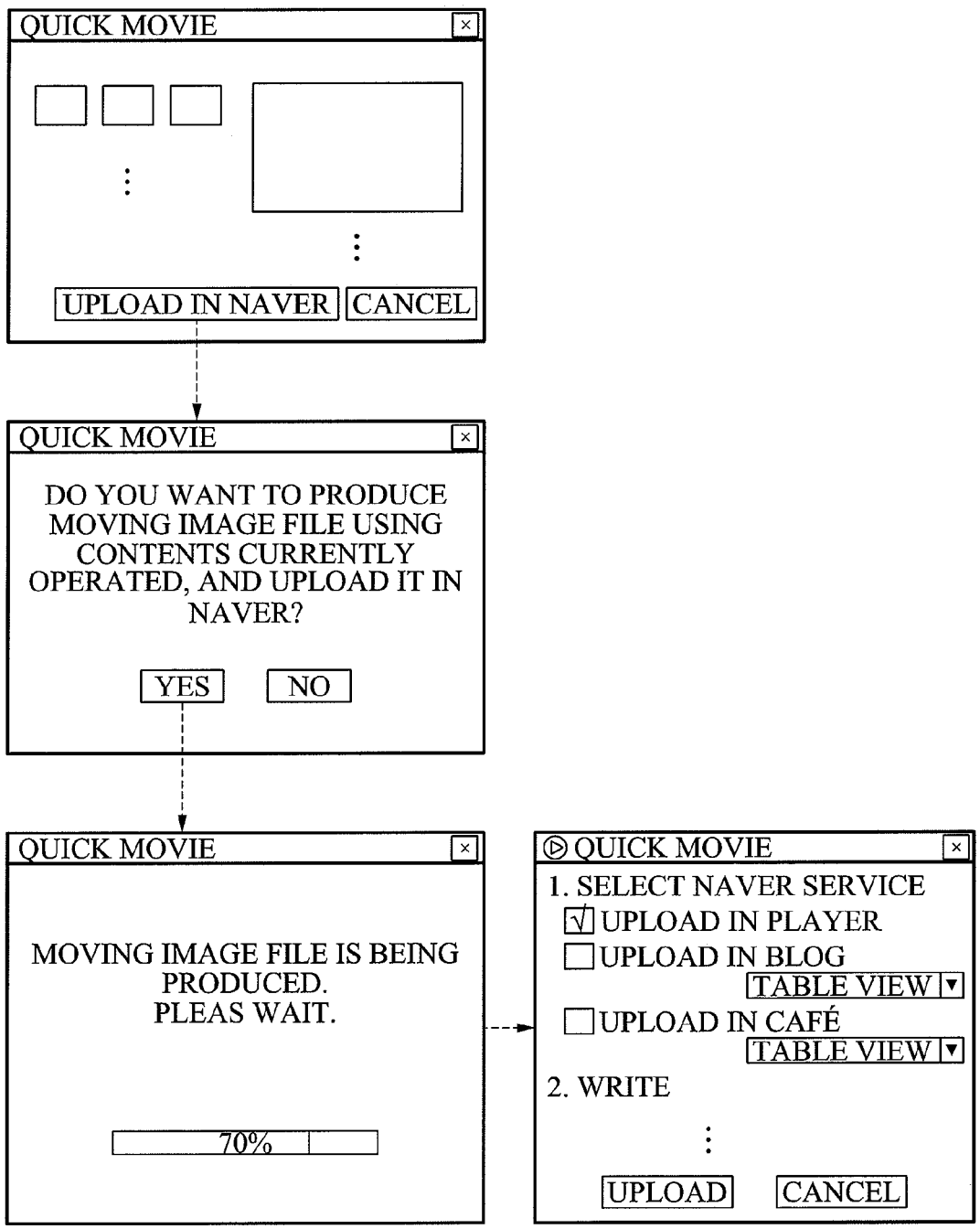
FIG. 7A is a diagram illustrating a first step for uploading the encoded pleasure image edited file to a specific website by the process described with reference to FIG. 6.
Figure 7B:
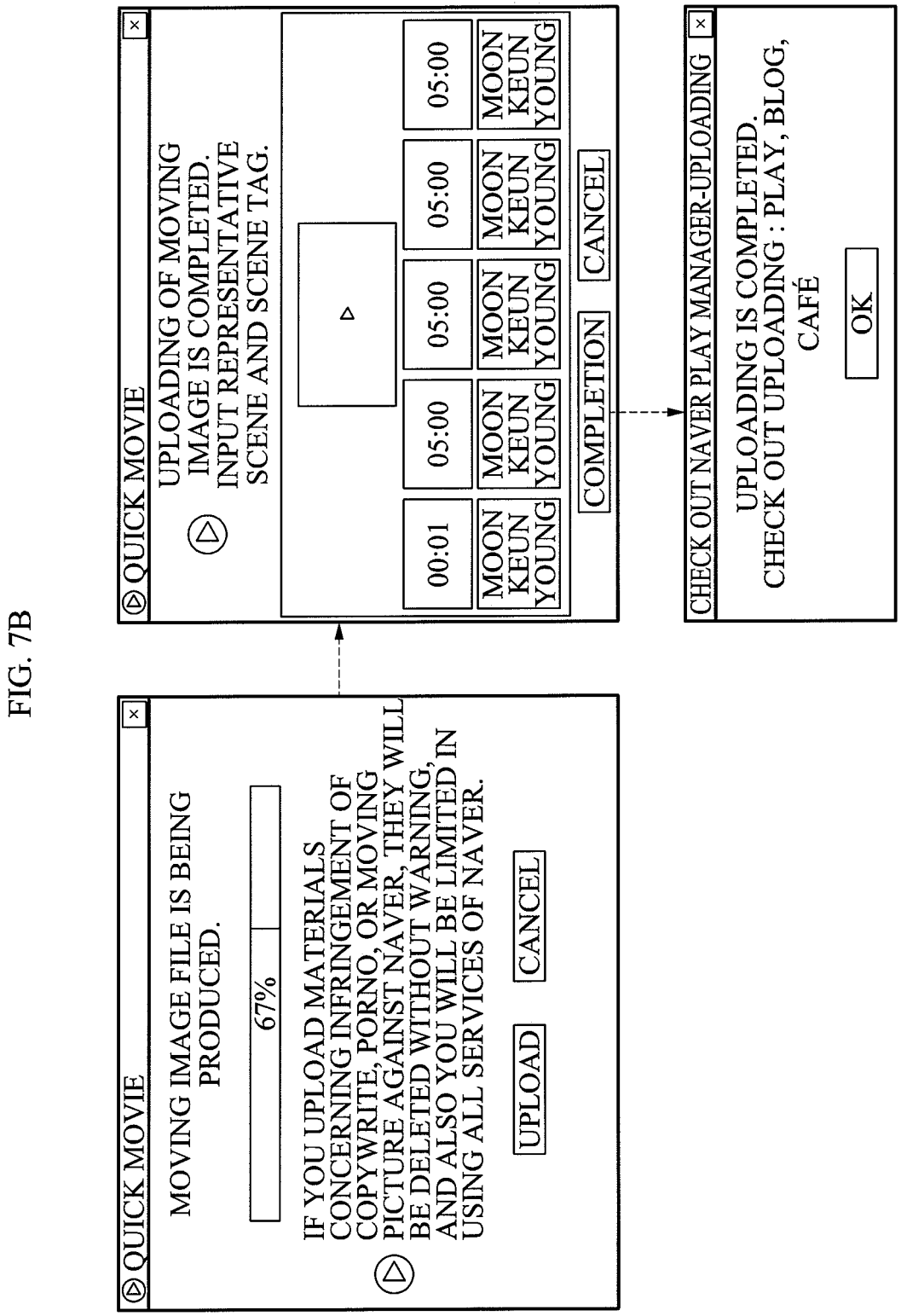
FIG. 7B is a diagram illustrating a second step for uploading the encoded pleasure image edited file to a specific website by the process described with reference to FIG. 6.
Figure 7C:
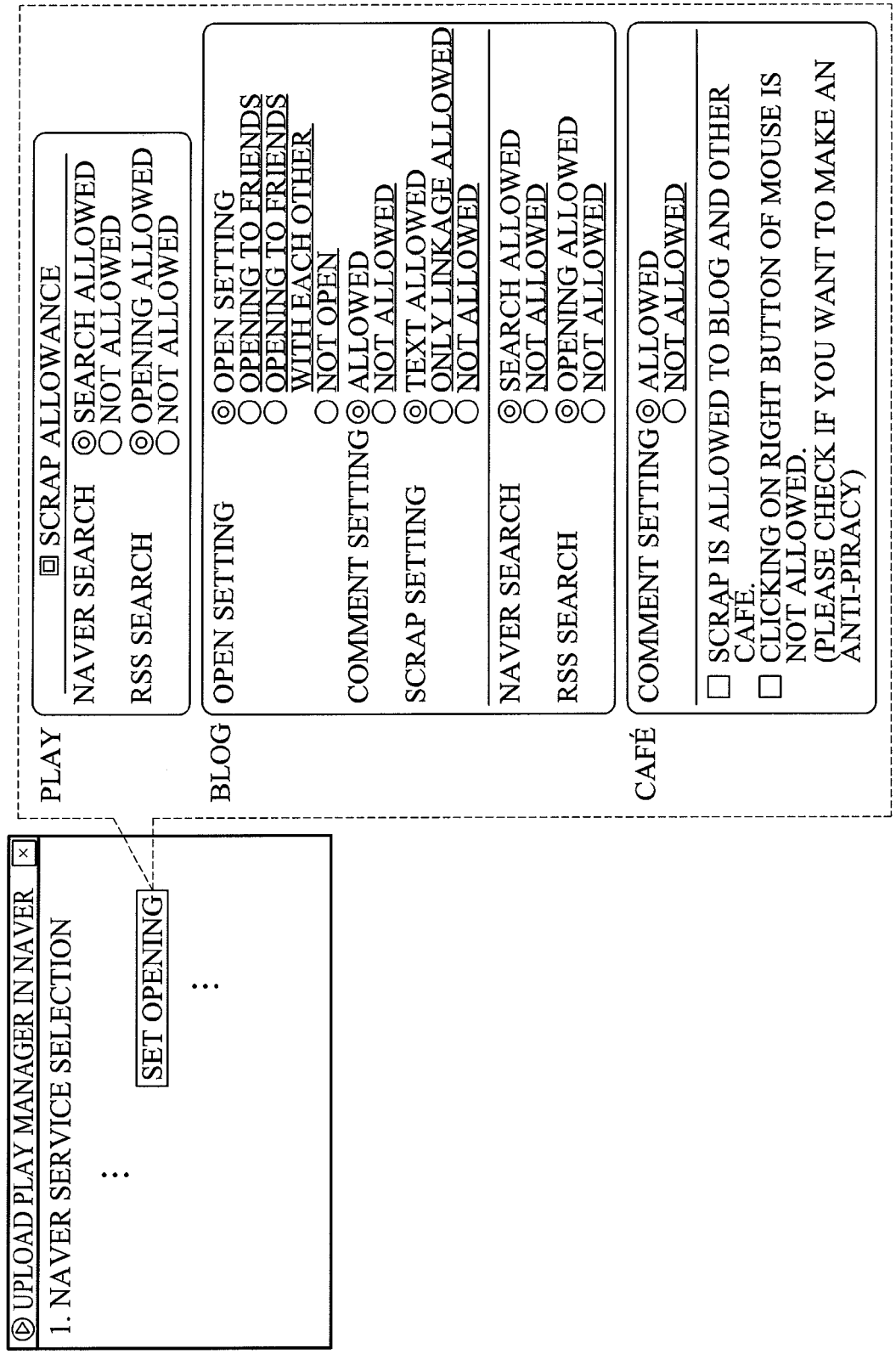
FIG. 7C is a diagram illustrating a third step for uploading the encoded pleasure image edited file to a specific website by the process described with reference to FIG. 6.

FIG. 7A is a diagram illustrating a first step for uploading the encoded pleasure image file to a specific website by the process described with reference to FIG. 6, FIG. 7B is a diagram illustrating a second step for uploading the encoded pleasure image file to a specific website by the process described with reference to FIG. 6, and FIG. 7C is a diagram illustrating a third step for uploading the encoded pleasure image file to a specific website by the process described with reference to FIG. 6.

As described above, when a pleasure image file generating process as described in FIG. 7A is completed, a guiding screen for checking whether to upload the pleasure image file to a specific website may be automatically generated. Also, it may be allowed that the user determines whether the pleasure image file is uploaded to a specific blog, café, and the like having a predetermined website address. Also, it may be allowed that once the user sets the process described with reference to FIG. 7A in advance, the generated pleasure image file may be always uploaded to a specific website when the pleasure image file generating process is completed. Also, a website address where the user frequently uploads pleasure images via the Internet is searched for and stored in advance, and when the user does not execute a specific operation, the generated pleasure image file may be automatically uploaded to the stored website address.

As illustrated in FIG. 7B, the uploaded pleasure image file may be reviewed on the Internet, and as illustrated in FIG. 7C, open setting of the pleasure image file may be separately determined. However, the open setting of the pleasure image file may be determined by the user every time the pleasure image generation is completed, or once the user determines the opening setting in advance, an identical opening setting may be determined, thereby satisfying various needs of users, and improving convenience of users.

Figure 8:
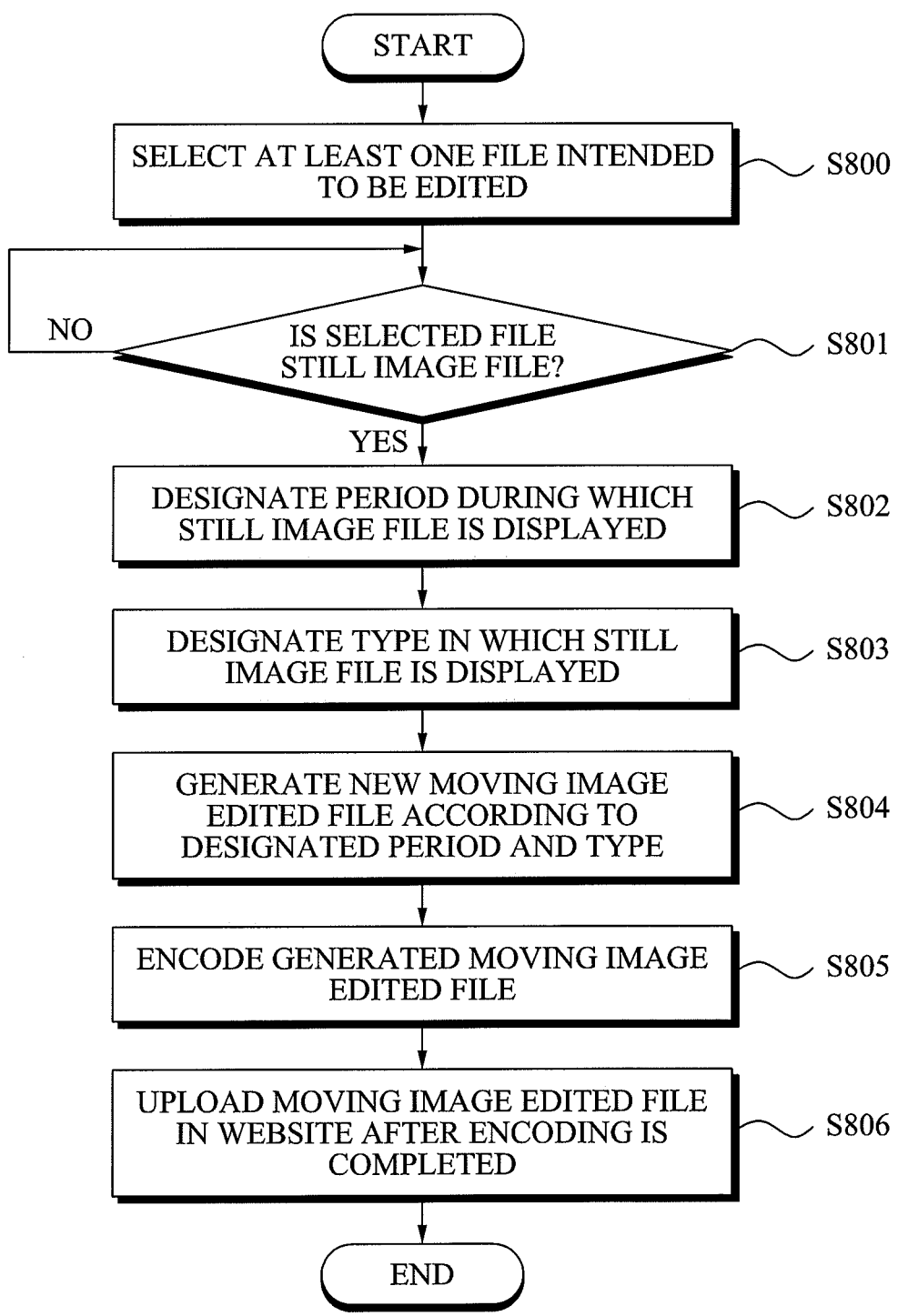
FIG. 8 is a flowchart illustrating a method for automatically generating an edited file according to an embodiment of the invention.

FIG. 8 is a flowchart illustrating a method for automatically generating an edited file according to an embodiment of the invention. FIG. 8 shows sequential descriptions of the above FIGS. 1 to 7C, and thus detailed descriptions thereof will be omitted.

In operation S800, the apparatus according to an embodiment of the invention selects at least one file intended to be edited. In operation S801, the apparatus determines whether the selected file is a still image file, and loops until it is determined in operation S801 that the selected file is a still image file. In operation S802, the apparatus designates a period during which the still image file is displayed according to a predetermined criterion when the selected file is the still image file. In operation S803, the apparatus designates a type in which the still image file is displayed.

In operation S804, the apparatus generates the still image file and other selected files, which are selected according to the designated period and type, to be a new pleasure image edited file. In operation S805, the apparatus encodes the generated pleasure image file into a format capable of being uploaded to an arbitrary Internet website. In operation S806, the apparatus uploads the encoded pleasure image file to the arbitrary Internet website when the encoding is completed.

The method for automatically generating the edited file according to the above-described embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of embodiments of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

As described above, according to an embodiment of present invention, images of various styles may be provided, and various needs of users may be met. According to an embodiment of the present invention, a still image having been stored may be generated to be a dynamic pleasure image file. According to an embodiment of the invention, processes performed by a user in generating an edited file may be minimized, and the convenience of the user may be improved. According to an embodiment of the invention, a file edited into a style useful to the user may be quickly uploaded to a specific website.

Although embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A computer-implemented method for editing an image file, the method comprising:
    determining, by a processor of the computer, still images from received image files, the received image files including a plurality of still images and a plurality of moving images;
    creating, by the processor, a moving image by designating a display special effect to the determined still images such that the display special effect is displayed for a threshold time, the threshold time being determined based on an attribute of the still image file, the attribute of the still image being at least one of a file size, a compression type, and a creation date of the determined still images; and
    encoding the created moving image to upload to a website, the website including, a blog which provides services including at least one of a text service, a posting images service, linking to other blogs, and linking to a media service, the encoding including setting restrictions for the created moving image, the restrictions including restrictions on opening the created moving image and on commenting on the created moving image.

2. The method of claim 1, further comprising:
    determining still images for editing.

3. The method of claim 1, wherein creating the moving image comprises:
    one of reducing and enlarging at least part of the determined still images being displayed on the screen.

4. The method of claim 1, further comprising:
    monitoring a sequence of a plurality of still images from the image files.

5. The method of claim 1, further comprising:
    receiving a sequence associated with displaying the created moving image.

6. The method of claim 1, wherein a same period of the threshold time is applied to each of the determined still images.

7. The method of claim 6, wherein the threshold time is further determined based on a period of displaying the created moving image.

8. The method of claim 1, wherein at least one of the determined still images is applied with a different length of a period to the period of the threshold time.

9. The method of claim 1, wherein the applied display special effect comprises moving a whole still image from one position to another on the screen, enlarging at least part of a still image, reducing the size of a part of a still image, or any combination thereof.

10. The method of claim 1, wherein the display special effect is applied in a random manner or a predetermined manner.

11. The method of claim 1, wherein a transition special effect is applied while transitioning between two of the determined still images.

12. The method of claim 11, wherein the display special effect comprises a fade effect, a dissolve effect, a blind effect, a mosaic effect, a page turning-over effect, or any combination thereof.

13. The method of claim 1, further comprises:
receiving at least one video file including a plurality of video images; and
incorporation at least one of the video images into the created moving image.

14. The method of claim 1, wherein the attribute of the still image is based on a threshold time of an other still image.

15. A non-transitory computer-readable storage medium including an executable program, which when executed by a processor, configures the processor to include:
a determination unit configured to determine still image files from image files being sequentially received for editing the still image files; and
a generation unit, coupled to the processor, configured to create moving image files by designating a special effect to the determined still image files such that the display special effect is displayed for a threshold time which is determined based on an attribute of the still image file, the attribute of the still image being at least one of a file size, compression type, and a creation date of the determined still images; and
a control unit configured to encode the created moving image files for uploading to a website, the website including a blog which supports services including at least one of a text service, a posting images service, linking to other blogs, and linking to a media service, the encoding including setting restrictions for the created moving image files, the restrictions including restrictions on opening the created moving image files and on commenting on the created moving image files.

16. The non-transitory computer-readable storage medium of claim 15, wherein the image files comprise still image files and moving image files.

17. The non-transitory computer-readable storage medium of claim 15, wherein the control unit is configured to encode the created moving image files into a format capable of being uploaded to the website.

18. An apparatus comprising:
a processor, coupled to a memory, configured to determine whether still image data being required to be edited in association of moving image data, wherein the processor is configured to edit a format of the determined still image data by designating a special effect such that the display special effect is displayed for a threshold time, the threshold time being determined based on an attribute of the still image file, the attribute of the still image being at least one of a file size, a compression type, and a creation date of the determined still images, and wherein the edited moving image data applied by the special effect is uploaded to display in a website including a blog, wherein a user interface is configured to set restrictions for the uploaded images, the restrictions including restrictions on opening the uploaded images and on commenting on the uploaded images.

19. The apparatus of claim 18, further comprising:
a control unit, executed by the processor, configured to encode the edited still image data in a format capable of uploading the edited still image data to the website.

20. The apparatus of claim 18, wherein the processor is configured to change a format of the edited still image data to display the edited still images to the website.

21. A method using a processor, the method comprising:
detecting, by the processor, still image data from data files received in sequence, the received data files including a plurality of moving image data and still image data;
creating, by the processor, moving images by designating a display special effect to the detected still image data such that the display special effect is displayed for a threshold time which is determined based on an attribute of the still image file, the attribute of the still image being at least one of a file size, a compression type, and an editing date of the determined still images; and
encoding the created moving images to upload to display to a web site including a blog providing services including at least one of a text service, posting images service, linking to other blogs, and linking to a media service, the encoding including setting restrictions for the created moving image, the restrictions including restrictions on opening the created moving image and on commenting on the created moving image.

* * * * *